Feb. 21, 1928.  
L. DE FOREST  
1,659,910  
SLOT CLEANER FOR PHONOFILM ATTACHMENTS FOR MOTION PICTURE MACHINES  
Filed April 28, 1923
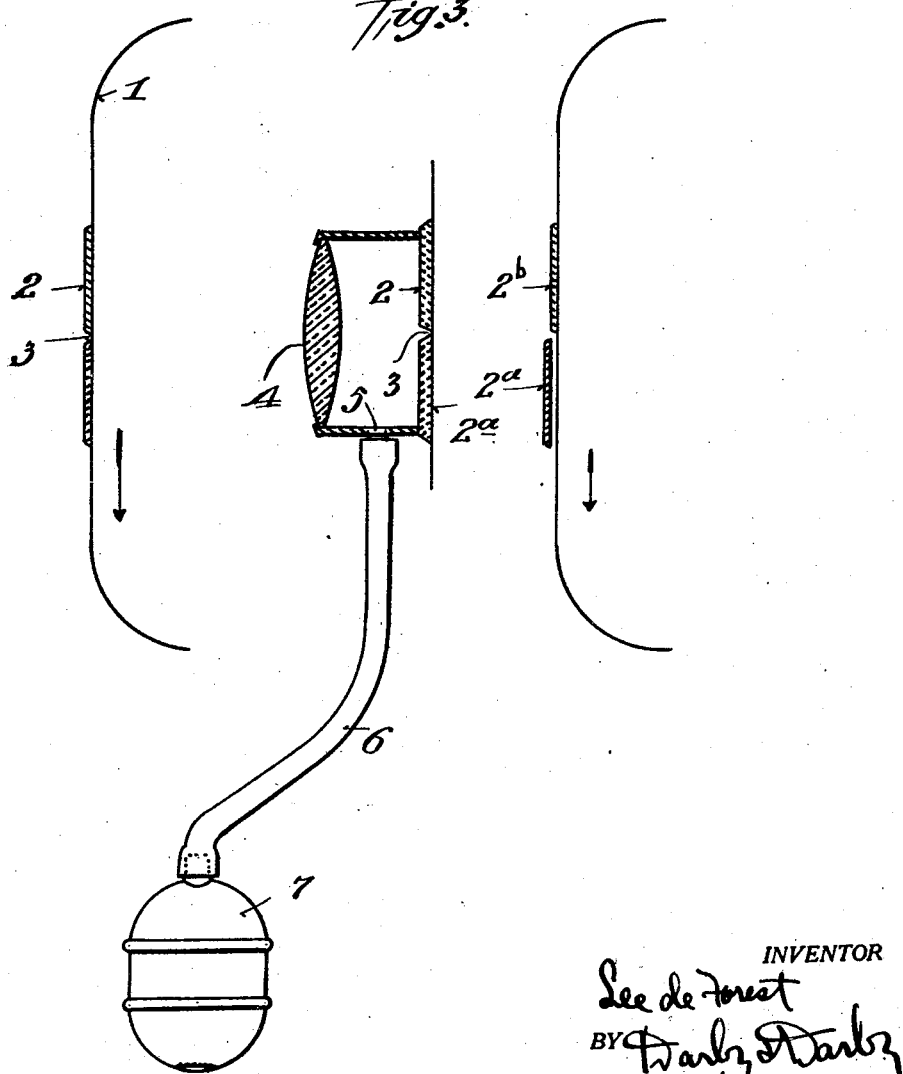
INVENTOR  
Lee de Forest  
BY  
his ATTORNEYS Patented Feb. 21, 1928.

1,659,910

UNITED STATES PATENT OFFICE.

LEE DE FOREST, OF NEW YORK, N. Y., ASSIGNOR TO DE FOREST PHONOFILM CORPORATION, A CORPORATION OF DELAWARE.

SLOT CLEANER FOR PHONOFILM ATTACHMENTS FOR MOTION-PICTURE MACHINES.

Application filed April 28, 1923. Serial No. 635,331.

This invention relates to means for cleaning a light slot in a motion picture machine adapted to record and reproduce sound such as a projector or camera, which is simple and efficient in operation and economic in manufacture.

The further object of the invention is to provide means which will permit of the cleaning of the light slot in motion picture apparatus adapted to record and reproduce sound which may be operated during the operation of such apparatus.

Further objects of the invention will appear more fully hereinafter.

The invention consists substantially in the construction, combination and location and relative arrangement of parts, all as will be more fully hereinafter set forth, as shown by the accompanying drawing and finally pointed out in the appended claims.

Referring to the drawing:

Fig. 1 shows diagrammatically a structure section of a light slot or slit such as is commonly embodied in motion picture apparatus for recording and reproducing sound.

Fig. 2 is the same view, showing a light slot constructed in accordance with the principles of my invention.

Fig. 3 is a similar view of the modified construction embodied in my invention.

The same part is designated by the reference character wherever it occurs throughout the several views.

In the practical operation of motion picture machines for recording and reproducing sound, such as projectors or cameras, and especially in such types of machine which are employed for photographic sound waves, it is customary for the light from the source thereof to pass through, what is termed in the art "a light slot or slit" past which the film is moved. Due to the fact that this slot or slit must of necessity be of extremely small size, especially in the talking moving picture art, and the further fact that the film in its transit through the machine picks up and carries therewith fine dust specks and other extraneous material, one source of difficulty has been that the light slot or slit has become clogged thereby impairing the efficiency of the machine in the motion picture photography art, causing the detector imperfect recording or reproduction, etc.

It is the special purpose of my present invention to provide a simple and efficient means for overcoming this difficulty, among others, and to provide a light slot or slit structure, or means arranged therewith, to prevent same from becoming clogged, or to permit the cleaning thereof during the operation of the machine.

The principles of my invention may be accomplished in one of the following ways, and while I will show and describe the arrangements modifying the principles of my invention, I wish it to be understood that I do not wish to be limited or restricted thereto as many other arrangements will readily occur to those skilled in the art without departing from the spirit and scope of my invention, as defined in the claims.

Referring to the drawing, or more particularly to Fig. 1, reference character 1 designates the film which is caused to travel in the usual well known manner in the direction indicated by the arrow and the same is caused to pass by a light slot or slit which in this instance is customary and is formed in a plate by means of the V cut therein as indicated at 3 with the film passing on the back side of the plate 2 in contact therewith whereby it passes by the apex aperture of the V cut 3.

It is with this type of light slot or slit that the dust, dirt of other extraneous material carried by the film 1 clogs up the slot or slit formed by the V 3. In Fig. 2 I have shown one simple arrangement embodied in my invention for overcoming this difficulty wherein I form the light slot plate into portions 2$^b$ and 2$^a$ and offset laterally the plate 2$^a$ relative to plate 2$^b$.

It will be apparent that with this arrangement it is impossible for dirt, dust or the like to accumulate at the slot and of course plate 2$^a$ may be offset practically an infinitesimal distance whereby the purpose of my invention may be accomplished. To offer a clear showing thereof, however, in Fig. 2 the plate 2$^a$ has been moved a considerable distance laterally to the plate 2$^b$.

I do not desire to limit the embodiment of two separate plates 2$^b$ and 2$^a$, for it is obvious that the position 2$^a$ of a single plate may be offset or displaced by mounting or other operation to effect the same result.

In Fig. 3 I show a modified arrangement wherein the plate 2, which may be constructed of two portions as in Fig. 2, if desired, is positioned in the manner customary in the art, as is shown in Fig. 1. In this arrangement I mount the lens 4 in the casing, which is substantially air tight with respect to the plate 2 (or plates 2 and 2ª as the case may be). I also provide an inlet orifice 5 between the lens 4 and the plate or plates, which orifice is in communication, when accomplished by means of the flexible hose 6, with a feed compressor, for example—the compressor bulb 7.

When the light slot or slit 3 in this arrangement gives evidence of becoming clogged, a short compression may be given the bulb 7 to force air through slot 3 cleaning the same without in any way interfering with the operation of the machine, of which the slot is a part.

Having now set forth the objects and nature of my invention, and having shown and described the arrangements modifying the principles thereof, what I claim as new and useful and of my own invention and desire to secure by Letters Patent is:

1. The combination with a slit block having a light aperture of a motion picture machine for recording and reproducing sound of means for confining a gaseous medium adjacent the aperture and means creating a pressure within said confining means so that said medium will tend to escape through said aperture to clean it of dust and dirt.

2. The combination with the slit block having a light aperture therein of a motion picture machine for recording and reproducing sound, of a chamber of which said block forms one end and means for creating air pressure within said chamber to clean said light aperture.

In testimony whereof I have hereunto set my hand on this 23rd day of April A. D., 1923.

LEE DE FOREST.